(12) United States Patent
Lewis et al.

(10) Patent No.: US 11,095,715 B2
(45) Date of Patent: Aug. 17, 2021

(54) ASSIGNING STORAGE RESPONSIBILITY IN A DISTRIBUTED DATA STORAGE SYSTEM WITH REPLICATION

(71) Applicant: eBay Inc., San Jose, CA (US)

(72) Inventors: Mark S. Lewis, Pleasanton, CA (US); Anna Povzner, San Francisco, CA (US)

(73) Assignee: eBay Inc., San Jose, CA (US)

( * ) Notice: Subject to any disclaimer, the term of this patent is extended or adjusted under 35 U.S.C. 154(b) by 504 days.

(21) Appl. No.: 15/895,584

(22) Filed: Feb. 13, 2018

(65) Prior Publication Data

US 2018/0176302 A1 Jun. 21, 2018

Related U.S. Application Data

(63) Continuation of application No. 15/337,836, filed on Oct. 28, 2016, which is a continuation-in-part of application No. 14/495,431, filed on Sep. 24, 2014, now Pat. No. 9,800,575.

(60) Provisional application No. 62/250,336, filed on Nov. 3, 2015.

(51) Int. Cl.
*G06F 7/00* (2006.01)
*H04L 29/08* (2006.01)
*H04L 29/06* (2006.01)
*G06F 16/27* (2019.01)

(52) U.S. Cl.
CPC .......... *H04L 67/1095* (2013.01); *G06F 16/27* (2019.01); *H04L 67/1097* (2013.01); *H04L 67/42* (2013.01)

(58) Field of Classification Search
CPC . H04L 67/1094; H04L 67/1097; H04L 67/42; G06F 16/27
USPC ........................................................ 707/610
See application file for complete search history.

(56) References Cited

U.S. PATENT DOCUMENTS

| 5,612,865 A * | 3/1997 | Dasgupta ................. G06F 9/52 |
| | | 700/79 |
| 5,815,649 A | 9/1998 | Utter et al. |
| 7,035,971 B1 | 4/2006 | Merchant |
| 7,475,199 B1 * | 1/2009 | Bobbitt ................ G06F 16/119 |
| | | 711/154 |
| 7,631,023 B1 | 12/2009 | Kaiser et al. |
| 7,684,352 B2 | 3/2010 | Smith et al. |

(Continued)

OTHER PUBLICATIONS

"U.S. Appl. No. 15/337,836, Final Office Action dated Nov. 2, 2018", 28 pgs.

(Continued)

*Primary Examiner* — Tony Mahmoudi
*Assistant Examiner* — Michael Le
(74) *Attorney, Agent, or Firm* — FIG. 1 Patents

(57) ABSTRACT

A data location table master system generates a master data location table storing associations of tokens with storage nodes for varying responsibility levels. When the master data location table is updated, the data location table master system updates storage nodes affected by the update as well as other storage nodes and application nodes in the system. Then, the storage nodes and the application nodes store a copy of the master data location table. A token migration and synchronization process reallocates data object storage among the storage nodes based on the updated master data location table.

16 Claims, 11 Drawing Sheets

(56) References Cited

U.S. PATENT DOCUMENTS

| | | | | |
|---|---|---|---|---|
| 7,711,711 | B1* | 5/2010 | Linnell | G06F 3/0604 707/652 |
| 7,716,179 | B1 | 5/2010 | Agapiev et al. | |
| 8,214,388 | B2* | 7/2012 | Uppala | G06F 16/27 707/770 |
| 8,290,919 | B1* | 10/2012 | Kelly | G06F 16/137 707/698 |
| 8,392,368 | B1* | 3/2013 | Kelly | G06F 16/182 707/634 |
| 8,549,010 | B2 | 10/2013 | Oikarinen | |
| 8,768,981 | B1* | 7/2014 | Milne | G06F 16/182 707/822 |
| 9,053,167 | B1* | 6/2015 | Swift | G06F 16/27 |
| 9,336,263 | B2* | 5/2016 | Abadi | G06F 16/2386 |
| 9,632,878 | B1* | 4/2017 | Maccanti | G06F 16/2365 |
| 9,800,575 | B1 | 10/2017 | Lewis et al. | |
| 10,067,969 | B2* | 9/2018 | Rice | G06F 16/2282 |
| 10,425,480 | B2 | 9/2019 | Haapaoja et al. | |
| 2003/0028509 | A1 | 2/2003 | Sah et al. | |
| 2004/0268358 | A1* | 12/2004 | Darling | H04L 67/1008 718/105 |
| 2004/0268428 | A1 | 12/2004 | Howard, Jr. et al. | |
| 2005/0005200 | A1* | 1/2005 | Matena | G06F 9/5072 714/38.13 |
| 2006/0036494 | A1* | 2/2006 | Aufricht | G06Q 30/0264 705/14.64 |
| 2006/0259525 | A1 | 11/2006 | Bae et al. | |
| 2007/0028068 | A1* | 2/2007 | Golding | G06F 3/067 711/170 |
| 2007/0133587 | A1* | 6/2007 | Hibino | H04N 21/64746 370/428 |
| 2007/0168336 | A1* | 7/2007 | Ransil | G06F 16/958 |
| 2008/0082777 | A1 | 4/2008 | Sakaguchi et al. | |
| 2009/0024814 | A1 | 1/2009 | Eisler et al. | |
| 2009/0157684 | A1 | 6/2009 | Andersen et al. | |
| 2009/0204650 | A1 | 8/2009 | Wong et al. | |
| 2009/0271412 | A1* | 10/2009 | Lacapra | G06F 3/067 |
| 2009/0323696 | A1 | 12/2009 | Schwan et al. | |
| 2010/0106934 | A1 | 4/2010 | Calder et al. | |
| 2010/0161554 | A1 | 6/2010 | Datuashvili et al. | |
| 2010/0306464 | A1 | 12/2010 | Dawkins | |
| 2010/0313045 | A1 | 12/2010 | Olarig et al. | |
| 2011/0013638 | A1 | 1/2011 | Matthews et al. | |
| 2011/0072206 | A1 | 3/2011 | Ross et al. | |
| 2011/0106863 | A1 | 5/2011 | Mamidi et al. | |
| 2011/0184920 | A1 | 7/2011 | Vosshall et al. | |
| 2012/0060049 | A1 | 3/2012 | Uppala | |
| 2012/0078973 | A1* | 3/2012 | Gerdes | G06F 16/27 707/802 |
| 2012/0166726 | A1* | 6/2012 | De Schrijver | G06F 11/2094 711/114 |
| 2012/0173695 | A1* | 7/2012 | Li | H04L 29/08153 709/223 |
| 2012/0185437 | A1 | 7/2012 | Pavlov et al. | |
| 2012/0290714 | A1 | 11/2012 | Cohen | |
| 2012/0303791 | A1* | 11/2012 | Calder | G06F 9/5083 709/224 |
| 2013/0054756 | A1 | 2/2013 | Do | |
| 2013/0103904 | A1 | 4/2013 | Pangbom et al. | |
| 2013/0111129 | A1 | 5/2013 | Maki et al. | |
| 2013/0124780 | A1 | 5/2013 | Baderdinni et al. | |
| 2013/0268644 | A1 | 10/2013 | Hardin et al. | |
| 2014/0032528 | A1 | 1/2014 | Mandre et al. | |
| 2014/0164329 | A1 | 6/2014 | Guo et al. | |
| 2014/0188825 | A1 | 7/2014 | Muthukkaruppan et al. | |
| 2014/0236889 | A1 | 8/2014 | Vasan et al. | |
| 2014/0280765 | A1 | 9/2014 | Hughes et al. | |
| 2020/0125271 | A1* | 4/2020 | Kusters | G06F 3/0619 |

OTHER PUBLICATIONS

Applicant Initiated Interview Summary received for U.S. Appl. No. 14/495,431, dated Feb. 7, 2017, 4 pages.

Non-Final Office Action received for U.S. Appl. No. 14/495,431, dated Oct. 6, 2016, 11 pages.

Notice of Allowance received for U.S. Appl. No. 14/495,431, dated Jun. 16, 2017, 11 pages.

Response to Non-Final Office Action filed on Mar. 6, 2017 for U.S. Appl. No. 13/565,606, dated Oct. 6, 2016, 20 pages.

Non-Final Office Action Received for U.S. Appl. No. 15/337,836, dated Apr. 11, 2018, 30 pages.

Decandia, et al., "Dynamo: Amazon's Highly Available Key-Value Store", ACM SIGOPS Operating Systems Review, vol. 41 No. 6, ACM, Oct. 14-17, 2007, pp. 205-220.

Lakshman, et al., "Cassandra—A Decentralized Structured Storage System", ACM SIGOPS Operating Systems Review 44.2, 2010, 6 pages.

Stoica, et al., "Chord: A Scalable Peer-to-Peer Lookup Service for Internet Applications", ACM SIGCOMM Computer Communication Review, vol. 31. No. 4, ACM, Aug. 27-31, 2001, 12 pages.

U.S. Appl. No. 15/337,836, Examiner Interview Summary dated Jun. 25, 2018, 4 pages.

U.S. Appl. No. 15/337,836, Response filed Jun. 27, 2018 to Non Final Office Action dated Apr. 11, 2018, 13 pages.

Non-Final Office action received for U.S. Appl. No. 15/337,836, dated Apr. 8, 2019, 16 pages.

Response to Final Office Action filed on Feb. 20, 2019, for U.S. Appl. No. 15/337,836, dated Nov. 2, 2018, 14 pages.

Final Office Action Received for U.S. Appl. No. 15/337,836 dated Nov. 18, 2019, 19 pages.

Non Final Office Action Received for U.S. Appl. No. 15/337,836, dated Apr. 20, 2020, 18 pages.

Response to Final Office Action filed on Feb. 18, 2020 for U.S. Appl. No. 15/337,836, dated Nov. 18, 2019, 10 pages.

Response to Non-Final Office Action filed on Aug. 7, 2019 for U.S. Appl. No. 15/337,836, dated Apr. 8, 2019, 12 pages.

Applicant Initiated Interview summary received for U.S. Appl. No. 15/337,836 dated Dec. 3, 2020, 3 pages.

Final Office Action Received for U.S. Appl. No. 15/337,836, dated Oct. 19, 2020, 18 pages.

Applicant Initiated Interview Summary Received for U.S. Appl. No. 15/337,836 dated Jul. 1, 2020, 4 pages.

Applicant Initiated Interview Summary Received for U.S. Appl. No. 15/337,836 dated Jul. 6, 2020, 4 pages.

Response to Non-Final Office Action Filed on Jul. 7, 2020 for U.S. Appl. No. 15/337,836, dated Apr. 20, 2010, 11 pages.

Non Final Office Action Received for U.S. Appl. No. 15/337,836, dated Apr. 5, 2021, 23 pages.

* cited by examiner

|  | Tokens (*b*) | | | | |
|---|---|---|---|---|---|
|  | 1 | 2 | 3 | ... | *TotalTokens* |
| 1 | node ID | node ID | node ID |  | node ID |
| 2 | node ID | node ID | node ID |  | node ID |
| 3 | node ID | node ID | node ID |  | node ID |
| ... |  |  |  |  |  |
| *R* | node ID | node ID | node ID |  | node ID |

Responsibility levels (*a*)

FIG. 1B

ASSIGNING STORAGE RESPONSIBILITY IN A DISTRIBUTED DATA STORAGE SYSTEM WITH REPLICATION

CROSS-REFERENCE TO RELATED APPLICATION(S)

This application is a continuation of U.S. patent application Ser. No. 15/337,836, "Assigning Storage Responsibility in a Distributed Data Storage System with Replication," filed Oct. 28, 2016, which claims the benefit of U.S. Provisional Application 62/250,336, "Assigning Storage Responsibility in a Distributed Data Storage System with Replication," filed Nov. 3, 2015, both of which are incorporated by reference herein in their entirety. This application is also a continuation-in-part of U.S. patent application Ser. No. 14/495,431, "Assigning Storage Responsibility in a Distributed Data Storage System with Replication," filed Sep. 24, 2014, now U.S. Pat. No. 9,800,575, which claims the benefit of U.S. Provisional Application 62/250,336, "Assigning Storage Responsibility in a Distributed Data Storage System with Replication," filed Nov. 3, 2015, both of which are incorporated by reference herein in their entirety.

BACKGROUND

1. Technical Field

The present invention generally relates to the field of data storage and, in particular, to assigning storage responsibility in a distributed data storage system with replication.

2. Background Information

Consider a distributed data storage system with replication where the system synchronizes multiple application nodes and storage nodes regarding data object location information. Each storage node has different capabilities for storing data objects, and all storage nodes need to be synchronized with the same data object location information. If a storage node comes online or goes offline, the system needs to reallocate storage responsibility for various data objects among the storage nodes in a manner that is efficient and meets all the specified capabilities of the storage nodes. Reallocating storage responsibility may affect performance of storage nodes and, therefore, application nodes.

SUMMARY

The above and other issues are addressed by a method, non-transitory computer readable storage medium, and system for assigning storage responsibility in a distributed data storage system with replication. The storage system includes a plurality of storage nodes. Each storage node includes one or more storage devices and each storage node is divided into one or more partitions and each partition is associated with a unique token using a 1:1 mapping. A data object is associated with a token and is stored in a partition whose token matches the data object's token. An embodiment of the method comprises assigning tokens to a first storage node in the plurality of storage nodes for primary responsibility, and storing data objects associated with the tokens in one or more first storage devices within the first storage node. The method further comprises assigning the same tokens to a second storage node for secondary responsibility, and storing the data objects associated with the tokens in one or more second storage devices within the second storage node. The first storage devices have a higher performance than the second storage devices. Storing the data objects in the first and second storage devices is based on the higher performance of the first storage devices over the second storage devices An embodiment of the medium stores computer program modules executable to perform steps. The steps comprise assigning tokens to a first storage node in the plurality of storage nodes for primary responsibility, and storing data objects associated with the tokens in one or more first storage devices within the first storage node. The steps further comprise assigning the same tokens to a second storage node for secondary responsibility, and storing the data objects associated with the tokens in one or more second storage devices within the second storage node. The first storage devices have a higher performance than the second storage devices. Storing the data objects in the first and second storage devices is based on the higher performance of the first storage devices over the second storage devices An embodiment of the system comprises a non-transitory computer-readable storage medium storing computer program modules executable to perform steps. The steps comprise assigning tokens to a first storage node in the plurality of storage nodes for primary responsibility, and storing data objects associated with the tokens in one or more first storage devices within the first storage node. The steps further comprise assigning the same tokens to a second storage node for secondary responsibility, and storing the data objects associated with the tokens in one or more second storage devices within the second storage node. The first storage devices have a higher performance than the second storage devices. Storing the data objects in the first and second storage devices is based on the higher performance of the first storage devices over the second storage devices Additional embodiments relate to components, devices, systems, applications, improvements, variations, modifications and other technologies related to the above.

BRIEF DESCRIPTION OF THE DRAWINGS

FIG. 1B is a data location table of tokens and responsibility levels of storage nodes for storing data objects corresponding to those tokens, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1A:
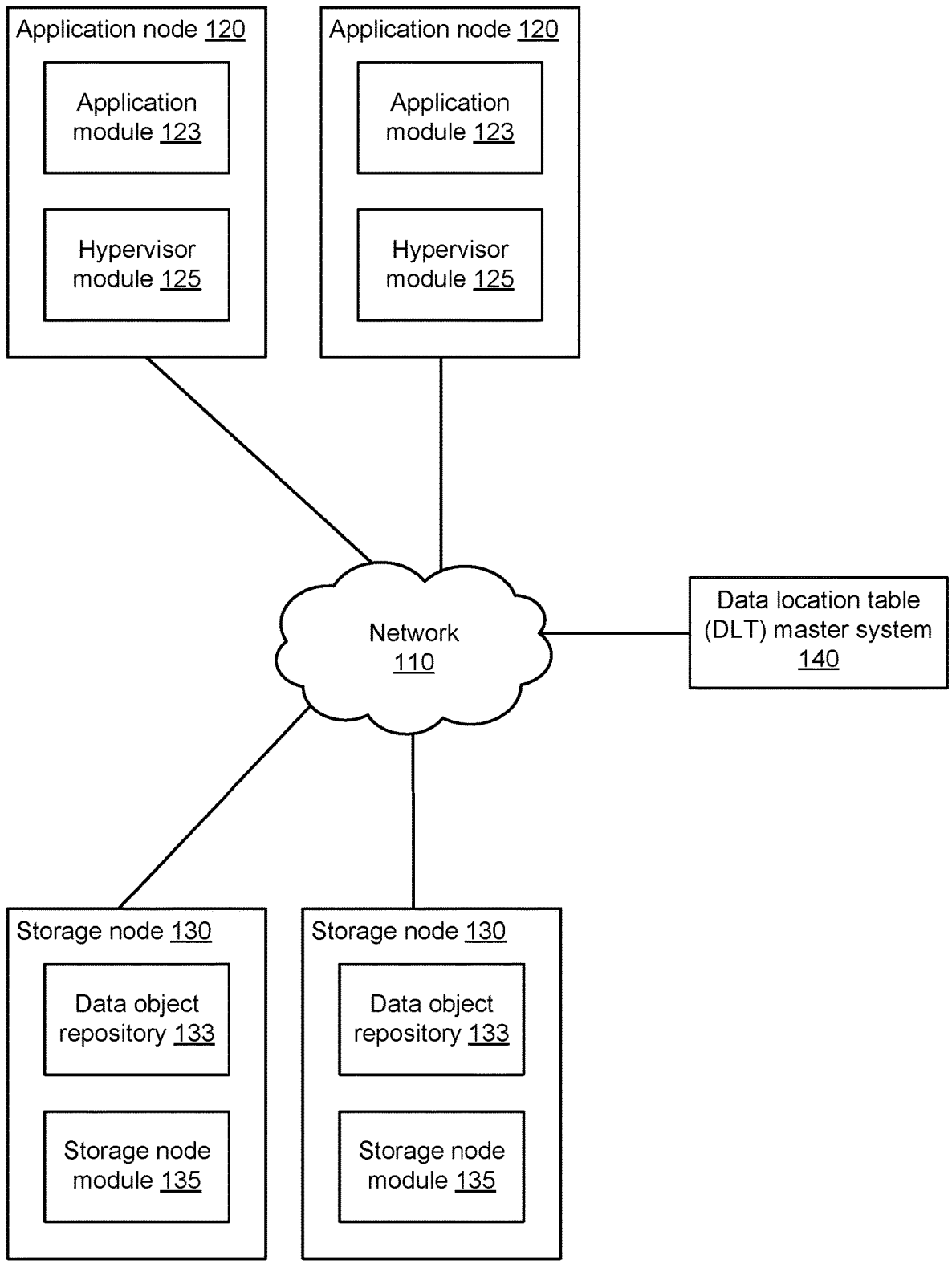
FIG. 1A is a high-level block diagram illustrating an environment for assigning storage responsibility in a distributed data storage system with replication, according to one embodiment.

FIG. 1A is a high-level block diagram illustrating an environment 100 for assigning storage responsibility in a distributed data storage system with replication, according to one embodiment. The environment 100 may be maintained by an enterprise that enables data to be stored in a distributed manner with replication, such as a corporation, university, or government agency. As shown, the environment 100 includes a network 110, multiple application nodes 120, multiple storage nodes 130, and a data location table (DLT) master system 140. While two application nodes 120 and two storage nodes 130 are shown in the embodiment depicted in FIG. 1A, other embodiments can have different numbers of application nodes 120 and/or storage nodes 130.

The network 110 represents the communication pathway between the application nodes 120, the storage nodes 130, and the DLT master system 140. In one embodiment, the network 110 uses standard wireless and wired communications technologies and protocols and can include the Internet and associated protocols. In another embodiment, the entities on the network 110 can use custom and/or dedicated data communications technologies.

An application node 120 is a computer (or set of computers) that provides standard application functionality and data services that support that functionality. For example, the application node 120 is a server that executes applications that work with stored data. The application node 120 includes an application module 123 and a hypervisor module 125. The application module 123 provides standard application functionality such as serving web pages, archiving data, or data backup/disaster recovery. In order to provide this standard functionality, the application module 123 issues write requests (i.e., requests to store data) and read requests (i.e., requests to retrieve data). The hypervisor module 125 handles these application data requests (e.g., write requests and read requests) received from the application module 123 by communicating with the storage nodes 130. The hypervisor module 125 determines which storage node 130 to communicate with based on a hypervisor data location table (DLT) 340, further described below with reference to FIG. 3.

A storage node 130 is a computer (or set of computers) that stores data. The storage node 130 can include one or more types of storage, such as hard disk, optical disk, flash memory, and cloud. For example, a storage node 130 handles data requests received from an application node 120 (e.g., the hypervisor module 125 of the application node 120), moves data objects, and stores data objects. The storage node 130 includes a data object repository 133 and a storage node module 135. The data object repository 133 stores data objects in partitions that are equally-sized address space regions. Each partition is associated with a token and has a one-to-one (1:1) mapping with the token. The total number of partitions which is also the total number of tokens is a configurable parameter of the environment 100. A data object is associated with a token, and multiple data objects can be associated with the same token. A data object is stored in the partition whose token matches the data object's token. So, a token is used to virtualize and locate a data object across multiple partitions and across multiple storage nodes 130.

The storage node module 135 handles data requests that are received via the network 110 from the hypervisor module 125 (e.g., hypervisor write requests and hypervisor read requests) and moves data objects within or between the storage nodes 130. The storage node module 135 moves data objects between storage nodes 130 in response to receiving a data location table from the DLT master system 140. The DLT provides information regarding allocations of tokens to partitions in the storage nodes 130. The storage node module 135 is further described below with reference to FIG. 4.

The DLT master system 140 initializes a master data location table (mDLT) 530 and updates the mDLT 530 as necessary. For example, the DLT master system 140 updates the mDLT 530 when one or more storage nodes 130 come online, when one or more storage nodes 130 go offline, when weights of one or more storage nodes 130 change, or any combination thereof. Then, the DLT master system 140 sends the updated mDLT 530 to the application nodes 120 and the storage nodes 130. The storage nodes 130 use the updated mDLT 530 to reallocate tokens to partitions in the storage nodes 130. In one embodiment, the number of tokens that are transferred between storage nodes 130 is the minimum number that is required in order to maintain appropriate distribution of primary tokens and replica tokens. Replica tokens are tokens assigned to storage nodes with responsibility levels that are not primary responsibility levels. Since a token transfer between two storage nodes results in migrating the data of the corresponding partition between the storage nodes, transferring more tokens than necessary causes unnecessary load on the system.

The DLT master system 140 deterministically allocates secondary responsibility for a storage node's partitions to remaining storage nodes based on their percent of remaining capability and deterministically allocates further levels of responsibility for a storage node group's partitions to remaining storage nodes based on their percent of remaining capability. Specifically, each partition is associated with a token, and primary responsibility for a token is allocated to storage nodes proportional to their relative capability. Secondary responsibility for a storage node's tokens is allocated to remaining storage nodes based on their percent of remaining capability, where each such node pair is called a secondary-level node group. Thus, k-level responsibility for a (k−1)-node group's tokens is allocated to remaining storage nodes (i.e., all storage nodes except the storage nodes in the (k−1)-node group) based on their percent of remaining capability. In one embodiment, in the event of storage node addition, removal, or change in capability, the tokens are transferred between the storage nodes such that optimal primary token distribution and secondary token dispersion is ensured. For each other (k>2) level, tokens are transferred until dispersion at this level cannot be improved.

FIG. 1B is a data location table (DLT) of tokens and responsibility levels of storage nodes for storing data objects corresponding to those tokens, according to one embodiment. A responsibility level is referred to herein using the variable a and indicates a level of responsibility for a token, referred to herein using the variable b. The responsibility levels are described as primary, secondary, tertiary, and so on for a=1, a=2, a=3, and so on, respectively. Henceforth, primary level of responsibility will be referred to as a "higher" responsibility level than secondary, tertiary, etc. responsibility levels. Thus, secondary responsibility level has a lower level of responsibility than primary level of responsibility and a higher level of responsibility than tertiary, etc. responsibility levels. The number of responsibility levels is referred to herein using the variable R and represents a replication factor, which is a configurable parameter of the environment 100. DLT[a,b] stores a storage node identifier (ID) associated with a storage node that holds a-level responsibility for token b. Further, DLT row a stores IDs of storage nodes 130 that have a-level responsibility for the various tokens. DLT column b stores IDs of storage nodes 130 that have various levels of responsibility for token b. A DLT is stored in the hypervisor data location table (hDLT) 340 of an application node 120, the storage node data location table (SN DLT) 430 of a storage node 130, and the mDLT 530 of the DLT master system 140, further described below in FIGS. 3-5. The hDLT 340, the SN DLT 430, and the mDLT 530 are identical unless they are in the process of being updated.

Figure 2:
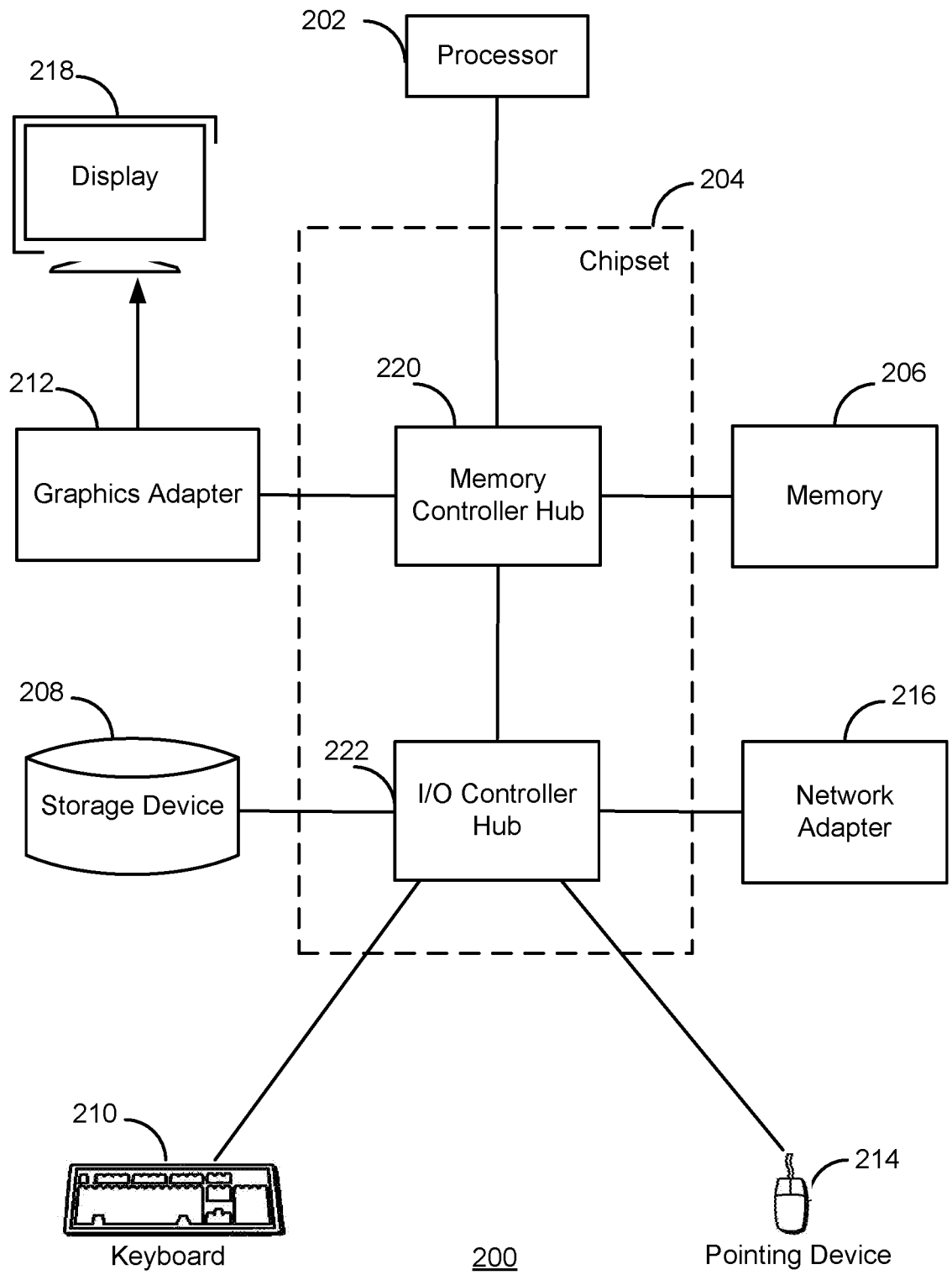
FIG. 2 is a high-level block diagram illustrating an example of a computer for use as one or more of the entities illustrated in FIG. 1A, according to one embodiment.

FIG. 2 is a high-level block diagram illustrating an example of a computer 200 for use as one or more of the entities illustrated in FIG. 1A, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the application node 120, the storage node 130, and/or the DLT master system 140 can be formed of multiple blade servers and lack a display device, keyboard, and other components.

The computer 200 is adapted to execute computer program modules for providing functionality described herein.

As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
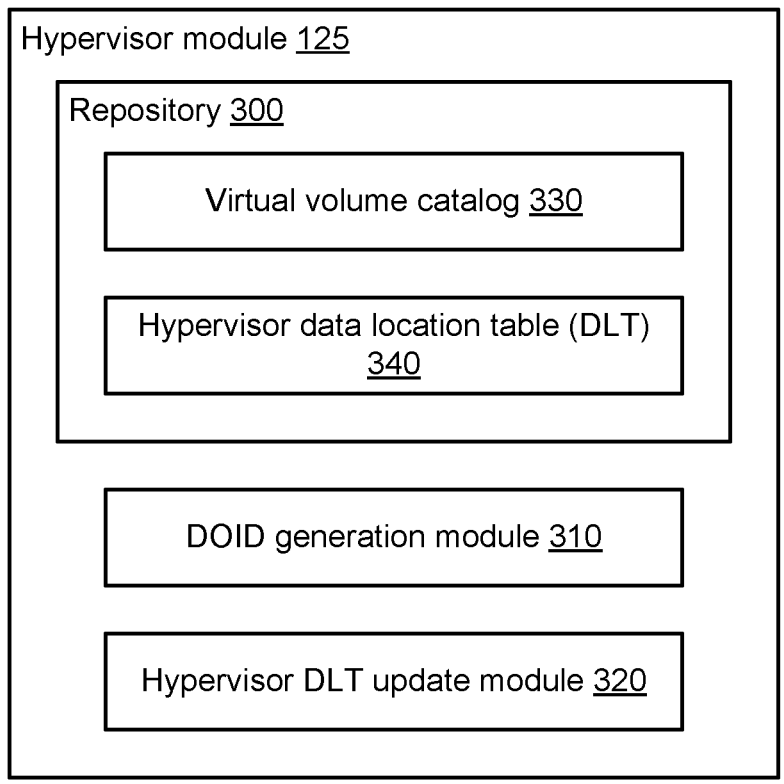
FIG. 3 is a high-level block diagram illustrating the hypervisor module from FIG. 1A, according to one embodiment.

FIG. 3 is a high-level block diagram illustrating the hypervisor module 125 from FIG. 1A, according to one embodiment. The hypervisor module 125 includes a repository 300, a DOID generation module 310, and a hypervisor data location table (hDLT) update module 320. The repository 300 stores a virtual volume catalog 330 and a hypervisor data location table (hDLT) 340.

The virtual volume catalog 330 stores 1:1 mappings between application data identifiers and data object identifiers (DOIDs). The application data identifier is the identifier used by the application module 123 to refer to the data within the application. Example application data identifiers include a file name, an object name, or a range of blocks. The DOID is a unique address that is used as the primary reference for placement and retrieval of a data object (DO). In one embodiment, the DOID is a 16-byte value, and the various bytes are used as follows:

Bytes 0-3 (collectively referred to as a "token") are used by the hypervisor module 125 for data object routing and location with respect to various storage nodes. Since the token portion of the DOID is used for routing, the DOID is said to support "implicit content routing." Bytes 4-5 can be used by the storage node module 135 for data object placement acceleration within a storage node 130 (e.g., across individual disks) in a similar manner to the data object distribution model used across the storage nodes. Bytes 6-15 are used as a unique identifier for the data object.

The hDLT 340 stores data object placement information, such as mappings between DOIDs (or portions thereof, such as tokens) and storage nodes 130. In one embodiment, one token is mapped to one or more storage nodes 130. The one or more storage nodes 130 are indicated by storage node identifiers. A storage node identifier is, for example, an IP address or another identifier that can be directly associated with an IP address. In one embodiment, the mappings are stored in a relational database to enable rapid access.

For a particular token, the identified storage nodes 130 indicate where a data object (DO) corresponding to the token is stored or retrieved. In one embodiment, a token is a four-byte value that can range from [00 00 00 00] to [FF FF FF FF], which provides more than 429 million individual data object locations. Since the environment 100 will generally include fewer than 1000 storage nodes, a storage node would be allocated many (e.g., thousands of) tokens to provide a good degree of granularity. In general, more tokens are allocated to a storage node 130 that has a larger capacity, and fewer tokens are allocated to a storage node 130 that has a smaller capacity.

The DOID generation module 310 takes as input a data object (DO), generates a data object identifier (DOID) for that object, and outputs the generated DOID. In one embodiment, the DOID generation module 310 generates the DOID by executing a specific hash function on the DO and using the hash value as the DOID. In general, the hash algorithm is fast, consumes minimal CPU resources for processing, and generates a good distribution of hash values (e.g., hash values where the individual bit values are evenly distributed). The hash function need not be secure. In one embodiment, the hash algorithm is MurmurHash3, which generates a 128-bit value.

Note that the DOID is "content specific," that is, the value of the DOID is based on the data object (DO) itself. Thus, identical files or data sets will always generate the same DOID and thus the same token. Since data objects (DOs) are automatically distributed across individual storage nodes 130 based on their tokens, and tokens are content-specific, duplicate DOs have the same token and are always sent to the same storage node 130. Therefore, two independent application modules 123 on two different application nodes 120 that store the same file will have that file stored on exactly the same storage node 130 because the DOIDs of the data objects as well as the tokens match. Since the same file is sought to be stored twice on the same storage node 130 (once by each application module 123), that storage node 130 has the opportunity to minimize the storage footprint through the consolidation or deduplication of the redundant data without affecting performance or the protection of the data.

The hypervisor DLT update module 320 receives a DLT from the DLT master system 140 and stores the received DLT in the hypervisor DLT 340. For example, the DLT received from the DLT master system 140 is an updated mDLT, and the hDLT 340 is updated to store the received DLT, thereby replacing the previous hDLT with the updated mDLT.

Figure 4:
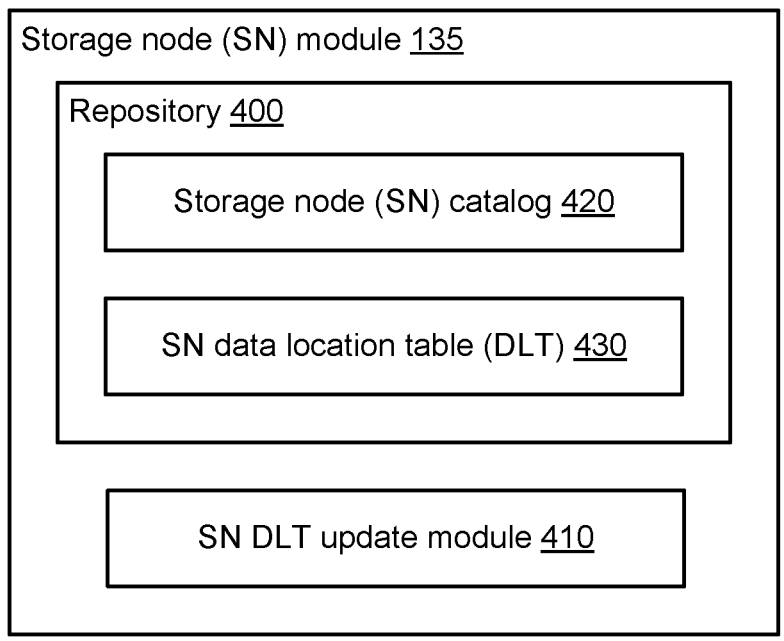
FIG. 4 is a high-level block diagram illustrating the storage node module from FIG. 1A, according to one embodiment.

FIG. 4 is a high-level block diagram illustrating the storage node (SN) module 135 from FIG. 1A, according to one embodiment. The storage node module 135 includes a repository 400 and a storage node data location table (SN DLT) update module 410. The repository 400 stores a SN catalog 420 and a SN DLT 430.

The SN catalog 420 stores 1:1 mappings between data object identifiers (DOIDs) and actual storage locations (e.g., on hard disk, optical disk, flash memory, and cloud). For a particular DOID, the data object (DO) associated with the DOID is stored at the actual storage location.

The SN DLT 430 stores data object placement information such as mappings between DOIDs (or portions thereof, such as tokens) and storage nodes 130. In one embodiment, one token is mapped to one or more storage nodes 130. The storage nodes 130 are indicated by storage node identifiers. A storage node identifier is, for example, an IP address or another identifier that can be directly associated with an IP address. In one embodiment, the mappings are stored in a relational database to enable rapid access.

The SN DLT update module 410 receives a DLT from the DLT master system 140 and calculates the difference between the received DLT and the SN DLT 430. For example, the received DLT is an updated mDLT providing current allocation information of tokens among partitions in the storage nodes 130. The difference between the received DLT and the SN DLT 430 results in a different set of tokens being allocated to the storage node associated with the SN DLT 430. Specifically, a different set of tokens are allocated to the partitions in the storage node. For the differing tokens, the SN DLT update module 410 initiates a token migration process. The token migration process is a bulk transfer of all data objects that are associated with a particular token from another storage node 130 which currently stores the data objects. After the token migration is done, the SN DLT update module 410 initiates a token synchronization process to synchronize any data objects that were newly added or existing data objects that have changed during the token migration. Then, the SN DLT update module 410 stores the received DLT in the SN DLT 430. The token migration and synchronization process is further described below in FIG. 8. Thus, the previous DLT stored in the SN DLT 430 is replaced with the received DLT. Then, the SN DLT update module 410 notifies the DLT master system 140 that the SN module's update process is complete (as further described below in FIG. 10), and the DLT master system 140 sends the updated mDLT to the application nodes 120 and remaining storage nodes 130.

Figure 5:
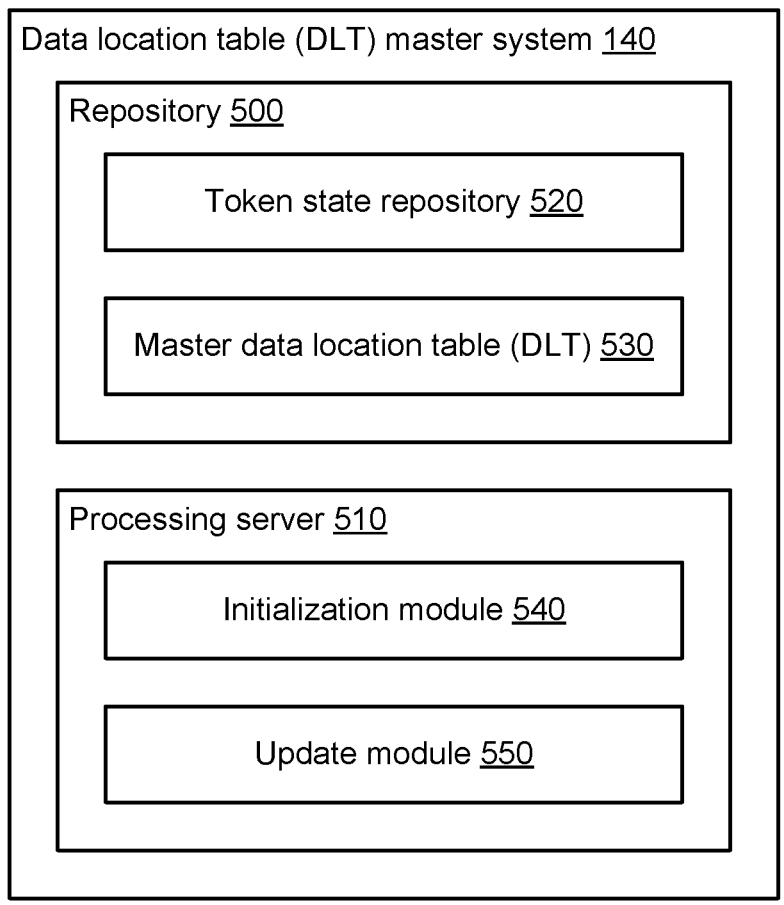
FIG. 5 is a high-level block diagram illustrating the data location table master system from FIG. 1A, according to one embodiment.

FIG. 5 is a high-level block diagram illustrating the DLT master system 140 from FIG. 1A, according to one embodiment. The DLT master system 140 includes a repository 500 and a processing server 510. The repository 500 stores a token state repository 520 and a mDLT 530. The processing server 520 includes an initialization module 540 and an update module 550.

The token state repository 520 stores a total number of storage nodes 130 (N), a replication factor (R), a total number of tokens (TotalTokens), a weight for each storage node i (Weight(i)), and a number (e.g., exact and/or integer) of tokens assigned to each storage node i for various levels of responsibility (Tokens(i), IntTokens(i), Tokens(i,j), IntTokens(i,j), Tokens(i,j,k), IntTokens(i,j,k), etc.). The total number of tokens equals to a total number of data partitions across all storage nodes 130. The token state repository 520 can also store a sum of weights of all the storage nodes 130 (Total Weight).

The replication factor R indicates a number of replicas of a DO in the storage nodes 130. For example, for R=1, there is 1 primary and no replicas of the DO. For R=2, there is 1 primary and 1 secondary replica. The total number of tokens (TotalTokens) is also equal to the number of columns in the DLT (e.g., hDLT 340, SN DLT 430, and mDLT 530). TotalTokens is a configurable parameter of the environment 100. The number of tokens assigned to various storage nodes 130 is further described below in conjunction with FIG. 6 and the operations of the initialization module 540.

A storage node 130 is assigned a weight based on the storage node's performance capability, the storage node's storage capacity, or both. In a system with homogeneous storage nodes 130, the weight of each node can be assigned a constant number (e.g., 1, 10, or 100).

The mDLT 530 stores data object placement information such as mappings between tokens and storage nodes 130. One token is mapped to one or more storage nodes indicated by storage node identifiers. A storage node identifier is, for example, an IP address or another identifier that can be directly associated with an IP address. In one embodiment, the mappings are stored in a relational database to enable rapid access. The mappings of the DLT stored in the mDLT 530 are sent to storage nodes 130 and application nodes 120 and used to update the SN DLT 430 and the hDLT 340, respectively.

The initialization module 540 calculates an exact number of tokens assigned to each storage node i for various levels of responsibility. Based on the exact number, the initialization module 540 calculates an integer number of tokens assigned to each storage node i for various levels of responsibility. Then, the initialization module 540 assigns the tokens to storage nodes based on the integer number of tokens and records the assignment of the tokens in the mDLT 530. The initialization module 540 is further described in FIG. 6.

When storage nodes 130 are added to or removed from the environment 100, the overall environment's 100 capacity and performance increase or decrease, respectively. The update module 550 calculates, for an updated set of storage nodes, integer numbers of tokens assigned to each storage node i for various levels of responsibility. The update module 550 calculates the difference between integer numbers for the previous set of storage nodes and the updated set of storage nodes and transfers tokens as necessary in the mDLT 530. Accordingly, the mDLT is updated. The update module 550 sends the updated mDLT 530 to an affected storage node 130. The update module 550 receives notification from the affected storage node 130 once the affected storage node's 130 update process is complete. Then, the update module 550 sends the updated mDLT 530 to the application nodes 120 and the remaining storage nodes 130. Note that the existing storage nodes 130 will continue to operate properly using the older version of the SN DLT 430 until the affected storage node's update process is complete. This proper operation enables the overall DLT update process to happen over time while the environment 100 remains fully operational.

In one embodiment, the update module 550 also insures that a subsequent failure or removal of a storage node 130 will not cause any other storage nodes to become overwhelmed. This is achieved by insuring that the alternate/redundant data (i.e., replica DOs) from a given storage node 130 is also distributed across the remaining storage nodes. The update module 550 is further described below in conjunction with FIG. 8.

Figure 6:
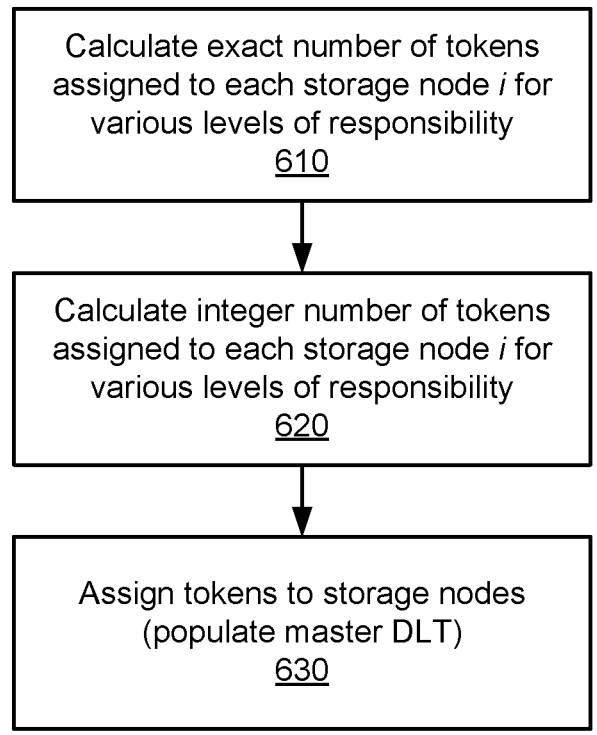
FIG. 6 is a flowchart illustrating a method of initializing the master data location table from FIG. 5, according to one embodiment.

FIG. 6 is a flowchart illustrating a method 600 of initializing the mDLT 530 from FIG. 5, according to one embodiment. In one embodiment, the method 600 is performed by the initialization module 540 when the environment 100 is initially configured. Other embodiments can perform the steps in different orders and can include different and/or additional steps. In addition, some or all of the steps can be performed by entities other than those shown in FIG. 5.

In step 610, the initialization module 540 calculates an exact number of tokens assigned to each storage node i for various levels of responsibility. The number of tokens assigned to each storage node i for various levels of responsibility can be calculated according to Equations (1)-(7). For node i, where node i has primary responsibility for the tokens, $$\text{Tokens}(i) = \frac{\text{Weight}(i)}{\text{TotalWeight}} * \text{TotalTakens}. \tag{1}$$

Thus, the number of tokens assigned to node i for primary responsibility (Tokens(i)), is based on node i's weight normalized by the total weight of all the storage nodes.

For node j, where node j has secondary responsibility for tokens for which node i has primary responsibility, $$\text{Tokens}(i, j) = \frac{\text{Tokens}(j)}{\text{TotalTokens} - \text{Tokens}(i)} * \text{Tokens}(i). \tag{2}$$

Storage nodes i and j will be referred to as a "node group" (or also referred to as node group (i,j)), where a node group is a set of nodes that have been assigned particular tokens, and each node holds a different level of responsibility for the particular tokens. The first node in the list is the primary node, the second node in the list is the secondary node, and so on. Tokens(i,j) can also be determined using Equation (3):

$$\text{Tokens}(i, j) = \frac{\text{Weight}(j)}{\text{TotalWeight} - \text{Weight}(i)} * \text{Tokens}(i). \tag{3}$$

The tokens assigned to node j with secondary responsibility and node i with primary responsibility (Tokens(i,j)) are a percentage of the number of tokens assigned to node i with primary responsibility (Tokens(i)).

For node k, where node k has tertiary level responsibility for tokens that are allocated for node group (i,j), $$\text{Tokens}(i, j, k) = \frac{\text{Tokens}(k)}{\text{Total}(\text{Tokens} - \text{Tokens}(i) - \text{Tokens}(j)} * \text{Tokens}(i, j). \tag{4}$$

Tokens(i,j,k) can also be determined using Equation (5):

$$\text{Tokens}(i, j, k) = \frac{\text{Weight}(k)}{\text{TotalWeight} - \text{Weight}(i) - \text{Weight}(j)} * \text{Tokens}(i, j). \tag{5}$$

Thus, the number of tokens assigned to node k with tertiary responsibility and to node j with secondary responsibility and node i with primary responsibility (Tokens(i,j,k)) is a percentage of tokens assigned to node group (i,j), where node j has a higher level of responsibility than node k.

The same pattern can be used to determine, for node l, where node l has l-level responsibility for tokens allocated to node group (i,j, . . . , m, l), $$\text{Tokens}(i, j, \ldots, m, 1 + \frac{\text{Tokens}(1)}{\text{TotalTokens} - \text{Tokens}(i)\text{Tokens}(j) - \ldots - \text{Tokens}(m)} * \text{Tokens}(i, j, \ldots m). \tag{6}$$

Tokens(i, j, . . . , m, l) can also be determined using Equation (7):

$$\text{Tokens}(i, j, \ldots m, l) = \frac{\text{Weight}(l)}{\text{TotalWeight} - \text{Weight}(i) - \text{Weight}(j) \ldots - \text{Weight}(m)} * \text{Tokens}(i, j, \ldots m). \tag{7}$$

Again, the number of tokens assigned to node l with l-level responsibility (Tokens(i, j, . . . , m, l)) is a percentage of the number of tokens assigned to node group (i, j, . . . , m), where node m has a higher responsibility level than node l.

The examples given above are based on weights Weight(i) for the storage nodes. These weights can be based on various factors, including the storage node's performance capability and/or the storage node's storage capacity. Thus, different behaviors can be implemented by using different formulations for the weights. If the weights are based primarily on storage capacity, the approach described above will emphasize equal filling of the storage nodes, for example so that all storage nodes are filled to roughly the same percentage of their full storage capacity. Storage nodes with larger storage capacities are weighted heavier and will be allocated more tokens. If some storage nodes become relatively more full than others, the updating process described below will tend to transfer data from the fuller storage nodes to the emptier storage nodes, thereby balancing out the situation.

On the other hand, if the weights are based primarily on I/O operations per second (IOPS), then the approach described above will emphasize equal utilization of the throughput of the storage nodes, for example so that all storage nodes are servicing I/O requests at roughly the same percentage of their maximum throughput. Storage nodes with higher performance capability are weighted heavier and will be allocated more tokens. Again, the updating process described below will tend to transfer data from the oversubscribed storage nodes to the undersubscribed storage nodes, thereby balancing out any temporary imbalances.

Other weights are also possible, including weights that account for both storage capacity and performance capability. Other allocation schemes are also possible. In one approach, the latency of the storage nodes is taken into account.

The concepts described above can also be applied within each storage node to the storage devices within a storage node. Each storage node may include many storage devices with different performance characteristics such as a mix of solid state memory and disk drives, or a mix of disk drives with different performance characteristics. Different storage devices within a storage node may have, for example, different access speeds, different latency, and/or different I/O operations per second. Therefore, tokens assigned to a storage node may be allocated among different storage devices in the storage node, according to the performance capability of the storage devices.

For example, if a storage node has primary responsibility for a token, that token may be allocated to storage devices with low latency (or other high performance characteristics), while secondary and lower levels of responsibility are allocated to lower performing storage devices. Since I/O operations preferably are serviced by the primary storage node, during normal operation when the primary storage node is available, I/O operations will have higher performance because the higher performing storage devices are utilized. During the occasional periods when the primary storage node is not available, I/O performance may be reduced as lower performing storage devices are accessed. On the other hand, since higher performing storage devices are usually more expensive, the use of lower performing storage devices for lower levels of responsibility reduces costs compared to copying the data to storage devices that all have the same performance as the primary storage to achieve redundancy. Thus, the asymmetric use of mixed media for redundant storage can significantly reduce costs without significantly compromising performance.

In yet another variation, the storage devices are grouped into classes according to their performance. All storage devices that are flash-based or equivalent may be grouped as one class, and all disk-based storage devices may be grouped as another class. Different levels of responsibility can be assigned to different classes. For example, primary and secondary levels of responsibility are assigned to the flash-based class, and tertiary and lower levels of responsibility are assigned to the disk-based class. Within each class, tokens may be allocated among the storage devices using the weight-based approach described above.

Returning to FIG. 6, in step 620, the initialization module 540 calculates an integer number of tokens assigned to each storage node i for various levels of responsibility. The integer numbers, herein denoted IntTokens, are based on the determined values Tokens(node(s)). For example, IntTokens (i) can be Tokens(i) rounded up or down to the nearest integer. However, for N nodes, the sum of IntTokens(i) for i=1 to N must equal to Total Tokens. In one embodiment, the first Q storage nodes get IntegerTokens(i)=Tokens(i) rounded down to the nearest integer+1, where Q is the difference between Total Tokens and rounded down Tokens (k). The remaining storage nodes get IntegerTokens(i), which is Tokens(i) rounded down to the nearest integer. Similarly, IntTokens(i,j) can be Tokens(i,j) rounded up or down to the nearest integer. However, the sum of IntTokens (i,j) for j=1 to N (excluding node i) must equal to IntTokens (i). The same pattern applies to Tokens(i, j, . . . , m, l), where IntTokens(i, j, . . . , m, l) can be Tokens(i, j, . . . , m, l) rounded up or down to the nearest integer. However, the sum of IntTokens(i, j, . . . , m, l) for l=1 to N (excluding storage nodes i, j, . . . , m) must equal to IntTokens(i, j, . . . , m). In one embodiment, the integer numbers of tokens assigned to each storage node i is stored in the token state repository 520.

In step 630, the initialization module 540 assigns the tokens to storage nodes. Thus, the initialization module 540 populates the mDLT 530. The assignment of tokens to storage nodes is based on the calculated integer numbers of tokens. The assignment of tokens to storage nodes is stored in a mDLT 530. Step 630 is further described below in conjunction with FIG. 7.

Figure 7:
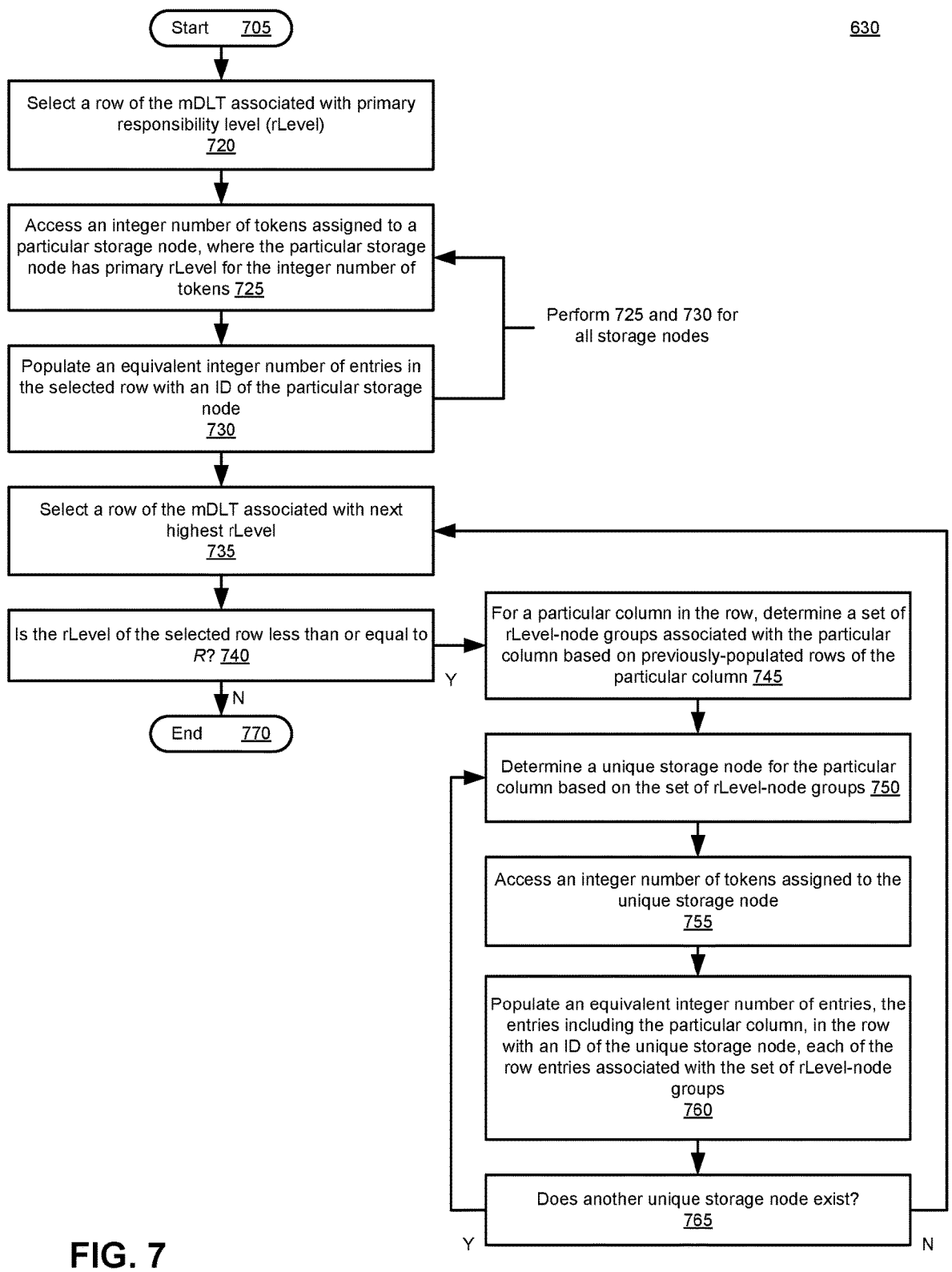
FIG. 7 is a flowchart illustrating a method of populating the master data location table from FIG. 5, according to one embodiment.

FIG. 7 is a flowchart illustrating a method 630 of populating the mDLT 530 from FIG. 5, according to one embodiment. The method 630 in FIG. 7 starts at 705 and corresponds to the step 630 in FIG. 6 and is performed by the initialization module 540. Other embodiments can perform the steps in different orders and can include different and/or additional steps. In addition, some or all of the steps can be performed by entities other than those shown in FIG. 5.

The row of the mDLT associated with primary responsibility level is selected 720. In one embodiment, the first row is associated with primary responsibility level. Any other suitable row can be associated with primary responsibility level. As described previously in conjunction with FIG. 1B, a DLT has R number of rows and Total Tokens number of columns and stores IDs of storage nodes.

An integer number of tokens assigned to a particular storage node is accessed 725. The integer number of tokens assigned to the particular storage node represents how many tokens for which the particular storage node has primary responsibility level. The sum of the integer numbers of tokens assigned to all of the storage nodes is equal to Total Tokens, which is equal to the total number of columns in the mDLT. The integer number of tokens calculated in step 620 can be accessed from the token state repository 520.

An equivalent integer number of entries in the selected row is populated 730 with an ID of the particular storage node. Therefore, in the row associated with primary responsibility level, if there is a storage node associated with 10 tokens, then 10 entries are populated with the storage node's ID. Steps 725 and 730 are performed for all storage nodes.

A row of the mDLT associated with the next highest responsibility level is selected 735. Thus, if the previous row was associated with primary responsibility level, then the next row is associated with secondary responsibility level.

A determination is made in step 740 regarding whether the responsibility level of the selected row is less than or equal to R. If the responsibility level of the selected row is not less than or equal to R, then the mDLT has been fully populated, and the method 630 ends 770. If the responsibility level of the selected row is less than or equal to R, then the mDLT has not been fully populated, and the method 630 proceeds to step 745.

A set of responsibility level-node groups is determined 745 for a particular column in the row. A particular column corresponds to a particular token. The set of responsibility level-node groups is associated with the particular column based on the previously-populated rows of the particular column. For example, if the selected row is associated with the secondary responsibility level, then the set of responsibility level-node groups includes the storage node ID located in the same column that are in the row associated with a higher responsibility level (e.g., the storage node ID in the same column that are in the row associated with primary responsibility). In another example, if the selected row is associated with an R-responsibility level, then the set of responsibility level-node groups includes the storage node ID located in the same column that are in another row associated with an R-1 responsibility level, and that are in another row associated with an R-2 responsibility level, etc. Thus, for a particular column, all storage node IDs in rows with lower responsibility levels than the selected row are included in the set of responsibility level-node groups associated with the column.

A unique storage node is determined 750 for the particular column based on the set of responsibility-level node groups. For example, if the particular column is in a row associated with secondary responsibility level and another row associated with primary responsibility in the same column has node ID of node i, then the unique storage node is at least not node i. Following the previous example, for the same token, the unique storage node in the set of responsibility-level node groups associated with a row associated with R-level responsibility is not a storage node associated with any responsibility level higher than R.

An integer number of tokens assigned to the unique storage node is accessed 755. For example, the integer number of tokens (e.g., calculated in step 620) can be accessed from the token state repository 520.

An equivalent integer number of entries including the entry associated with the particular column are populated 760 in the row with an ID of the unique storage node. Each of the row entries is associated with the set of responsibility level-node groups. For example, if the row is associated with secondary responsibility and the unique storage node is associated with 5 tokens, then 5 entries of the DLT in the row are filled with the storage node ID of the unique storage node, and the 5 entries are associated with the same set of responsibility level-node groups (e.g., have the same storage node associated with primary responsibility).

A determination is made in step 765 of whether another unique storage node exists. If another unique storage node does exist, then the row entries associated with the set of responsibility level-node groups are not fully populated, and the method 630 returns to step 750. If another unique storage node does not exist, then the row entries are fully populated, and the method returns to step 735.

Figure 8:
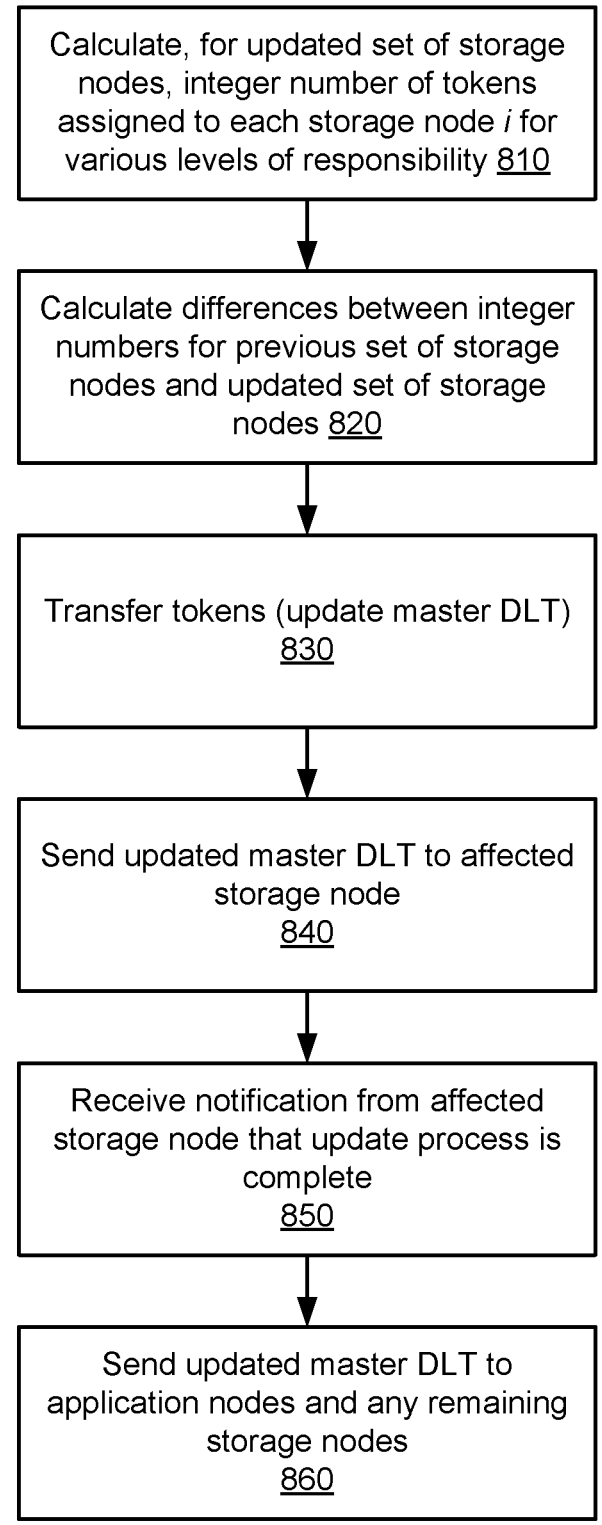
FIG. 8 is a flowchart illustrating a method of updating the master data location table from FIG. 5 and distributing the updated master data location table to application nodes and storage nodes, according to one embodiment.

FIG. 8 is a flowchart illustrating a method 800 of updating the mDLT 530 from FIG. 5 and distributing the updated mDLT to application nodes 120 and storage nodes 130, according to one embodiment. In one embodiment, the method 800 is performed by the update module 550 when a storage node is added to or removed from the environment 100, when prompted by the DLT master system 140, when weights of one or more storage nodes 130 change, an occurrence of another event, or any combination thereof. Other embodiments can perform the steps in different orders and can include different and/or additional steps. In addition, some or all of the steps can be performed by entities other than those shown in FIG. 5.

In step 810, the update module 550 calculates, for an updated set of storage nodes, an integer number of tokens assigned to each storage node i for various levels of responsibility. The integer number of tokens for each updated storage node can be calculated using Equations (1)-(7) described in conjunction with FIG. 6 and stored in the token state repository 520. The integer number of tokens for each updated storage node can also be calculated using any of the other approaches described above.

In step 820, the update module 550 calculates differences between integer numbers for a previous set of storage nodes and the updated set of storage nodes. The differences between the integer numbers for the previous set of storage nodes and the updated set of storage nodes can be calculated according to Equation (8):

$$\text{TokenDiff(node)} = \text{IntTokens(node in previous set)} - \text{IntTokens(node in updated set)} \qquad (8),$$

resulting in TokenDiff(node)>0 (meaning that there are more tokens assigned to the storage node than there should be given the updated set of storage nodes) or TokenDiff(node) <0 (meaning that there are fewer tokens assigned to the storage node than there should be). Other methods can be used to calculate the differences that result in similar indications for whether the storage node is associated with more or fewer tokens than the storage node should be.

In step 830, the update module 550 transfers tokens to create an updated mDLT. Based on the TokenDiff calculations, the tokens are transferred among the various storage nodes by modifying the storage node IDs in the different entries within each row of the DLT. Tokens assigned to storage nodes that have responsibility for more tokens than they should be are transferred to storage nodes that have responsibility for fewer tokens than they should be. For example, if node A previously was handling 10 tokens and now should handle 7, and node B previously was handling 5 tokens and now should handle 8, three tokens previously associated with node A are transferred to node B. Transferring tokens is further described in FIG. 9.

In step 840, the update module 550 sends the updated mDLT 530 to one or more affected storage nodes 130. An affected storage node is a storage node whose node ID was added to or removed from the previous mDLT during the update process (see step 830).

In step 850, the update module 550 receives notification from the affected storage node(s) 130 that the update process is complete. The update process is complete if the SN DLT 430 of the affected storage node 130 matches the updated mDLT 530.

In step 860, the update module 550 sends the updated mDLT 530 to application nodes 120 and any remaining storage nodes 130 so each has the updated mDLT 530.

Figure 9:
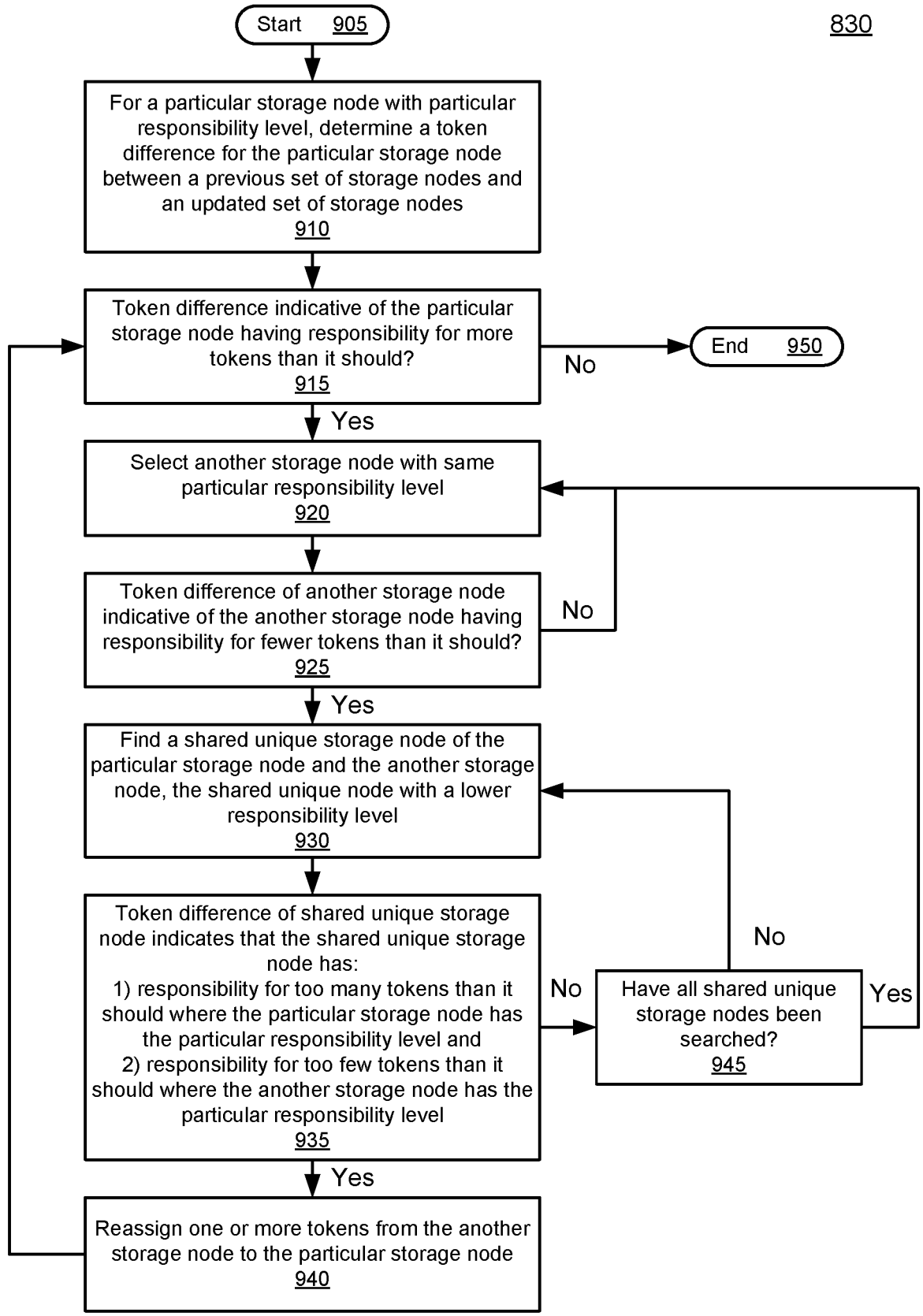
FIG. 9 is a flowchart illustrating a method of updating the master data location table from FIG. 5, according to one embodiment.

FIG. 9 is a flowchart illustrating a method 830 of updating the mDLT 530 from FIG. 5, according to one embodiment. The method 830 in FIG. 9 corresponds to the step 830 in FIG. 8 and is performed by the update module 550. Other embodiments can perform the steps in different orders and can include different and/or additional steps. In addition, some or all of the steps can be performed by entities other than those shown in FIG. 5. In one embodiment, the method 830 is performed once for each storage node 130.

The method 830 starts 905 and, for a particular storage node with particular responsibility level (e.g., primary responsibility level), a token difference is determined 910 for the particular storage node between a previous set of storage nodes and an updated set of storage nodes (see step 820).

In step 915, a determination is made regarding whether the token difference is indicative of the particular storage node having responsibility for more tokens than it should at that particular responsibility level, given the updated set of storage nodes 130. If the token difference is not indicative of the particular storage node having responsibility for more tokens than it should, then the method 830 ends 950. If the token difference is indicative of the particular storage node having responsibility for more tokens than it should, then the method 830 proceeds to step 920.

In step 920, another storage node with the same particular responsibility level as the particular storage node is selected. In this embodiment, if there is a particular storage node with a token difference indicative of the storage node having responsibility for too many or too few tokens, then there exists another storage node with a token difference indicative of the another storage node having responsibility for too few or too many tokens, respectively.

In step 925, a determination is made regarding whether the token difference of the another storage node is indicative of the another storage node having responsibility for fewer tokens than it should at that responsibility level. If the token difference is not indicative of the another storage node having responsibility for too few tokens, the method 830 proceeds to step 920. If the token difference is indicative of the another storage node having responsibility for too many tokens, the method 830 proceeds to step 930.

In step 930, a shared unique storage node of the particular storage node and the another storage node is found, where the shared unique storage node has a lower responsibility level than the particular responsibility level. For example, the particular storage node is storage node i, and the another storage node is storage node j, and both have primary responsibility for a number of tokens. Then, a shared unique storage node of storage node i and storage node j can be storage node k where storage node k has secondary responsibility for tokens with storage nodes i and j assigned with primary responsibility. If the storage node and the another storage node have R responsibility level, then the method 830 proceeds to step 940 (not shown).

In step 935, a determination is made regarding whether the token difference of the shared unique storage node indicates that the shared unique storage node has 1) responsibility for too many tokens than it should where the particular storage node has the particular responsibility level and 2) responsibility for too few tokens where the another storage node has the particular responsibility level. If the token difference does not indicate that the shared unique storage node has 1) responsibility for too many tokens where the particular storage node has the particular responsibility level and 2) responsibility for too few tokens where the another storage node has the particular responsibility level, the method 830 proceeds to step 945 because, following the previous example, tokens have to be assigned from storage node i to storage node j, and storage node k does not have responsibility for more tokens (with storage node i assigned with primary responsibility) than it should. If the token difference does indicate that the shared unique storage node has 1) responsibility for too many tokens where the particular storage node has the particular responsibility level and 2) responsibility for too few tokens where the another storage node has the particular responsibility level, the method 830 proceeds to step 940 because tokens have to be assigned from storage node i to storage node j, and storage node k also has responsibility for more tokens (with storage node i assigned with primary responsibility) than it should.

In step 940, one or more tokens are reassigned from the another storage node to the particular storage node. The number of tokens that are reassigned is less than or equal to the token difference of the particular storage node for the particular responsibility level and less than or equal to the token difference of the another storage node for the particular responsibility level.

In step 945, a determination is made regarding whether all shared unique storage nodes of the particular storage node and the another storage node have been searched. If all shared unique storage nodes have not been searched, then the method 830 proceeds to step 930. If all shared unique storage nodes have been searched, the method 830 proceeds to step 920.

Figure 10:
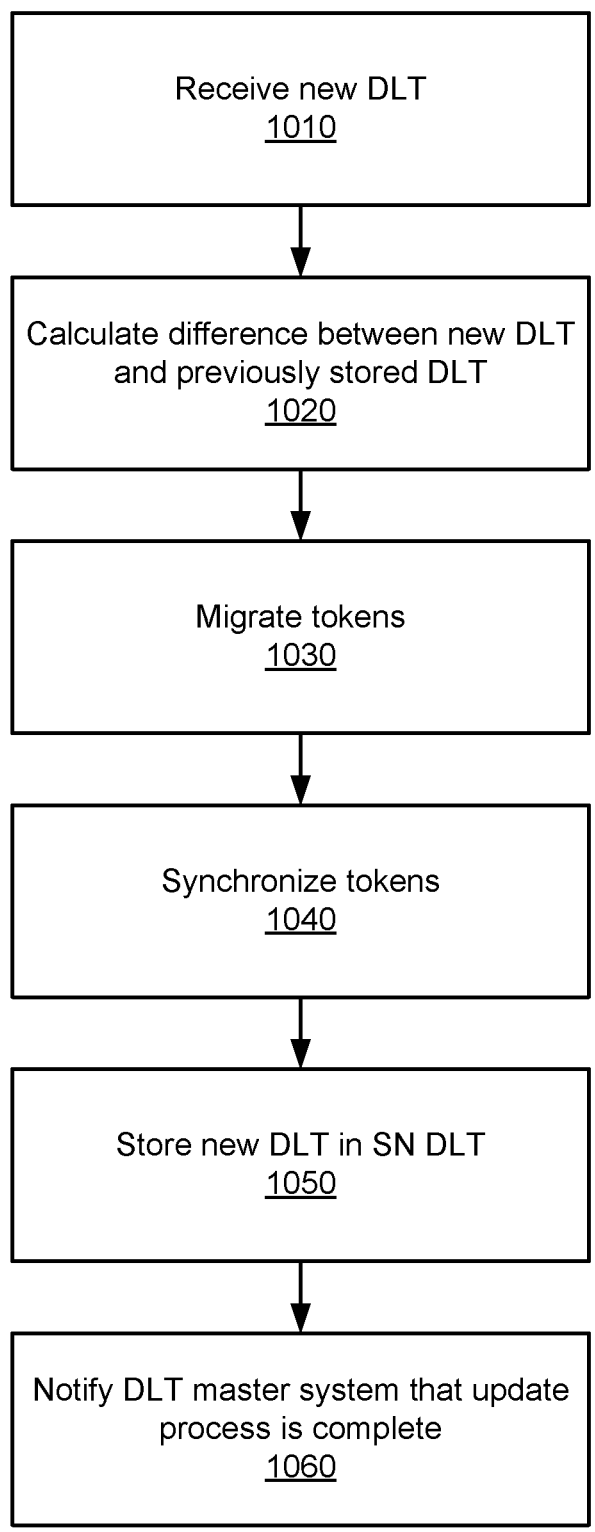
FIG. 10 is a flowchart illustrating a method of updating the storage node data location table from FIG. 4, according to one embodiment.

FIG. 10 is a flowchart illustrating a method 1000 of updating the SN DLT 430 from FIG. 4, according to one embodiment. In one embodiment, the method 1000 is performed by the SN DLT update module 410 when prompted by the DLT master system 140 with a DLT update or an occurrence of another event. Other embodiments can perform the steps in different orders and can include different and/or additional steps. In addition, some or all of the steps can be performed by entities other than those shown in FIG. 4.

In step 1010, the SN DLT update module 410 receives the new DLT (or the updated mDLT). The new DLT is received from the DLT master system 140 or, more specifically, from the update module 550 of the DLT master system 140.

In step 1020, the SN DLT update module 410 calculates a difference between the new DLT and the previously-stored DLT. The difference between the new DLT and the previously-stored DLT is a difference in storage locations for tokens (and their associated data objects) for various levels of responsibility according to the previously-stored DLT versus the new DLT. For example, token A was previously stored on storage node X for primary responsibility, as indicated by the previously-stored DLT. The new DLT indicates that token A is now stored on storage node Y for primary responsibility. Thus, the calculated difference includes information that data objects associated with token A should now be stored on storage node Y for primary responsibility, not storage node X. The difference can be calculated by comparing, for each token, a column associated with the token in the previously-stored DLT with a column associated with the token in the new DLT. The difference between the two columns can be computed as a set difference in one embodiment.

In step 1030, the SN DLT update module 410 migrates tokens. For a token whose previously-stored DLT column differs from its new DLT column, data objects associated with that token are transferred between the relevant storage nodes 130 for various levels of responsibility. For example, the data objects are transferred from the storage node 130 of the SN DLT update module 410 to another storage node or are transferred from another storage node (on which the data objects were previously stored) to the storage node of the SN DLT update module. Following the example from before, token A (and its associated data objects) is transferred from storage node X for primary responsibility to storage node Y. In an alternative embodiment, where the difference between two columns is calculated as a set difference, a token that has a non-NULL difference set causes a "migrate token" command to be sent to an affected storage node 130. Following the example from before, token A has a non-NULL difference set that causes a migrate token command to be sent to storage node X. In one embodiment, the DLT master system 140 sends a migrate token command to the SN DLT update module 410 associated with an affected storage node 130. In another embodiment, a token-destination storage node 130 sends a migrate token command to a token-origination storage node 130. Following the example from before, storage node Y (token-destination for token A) sends a migrate token command to storage node X (token-origination for token A).

In step 1040, the SN DLT update module 410 synchronizes tokens. During synchronization, the newly-transferred data objects are stored in the storage node 130 associated with the SN DLT update module 410, for example, in the place of a data object whose token is no longer associated with the storage node 130 (e.g., will be or has been migrated during the token migration process). Optionally, data objects that were newly-added or existing data objects that were changed during the migration process (see step 1030) are synchronized. In the alternative embodiment where a migrate token command is sent to an affected storage node 130, the SN DLT update module 410 of the affected storage node moves data objects from that storage node to another storage node as indicated by the new DLT.

In step 1050, the SN DLT update module 410 stores the new DLT in the SN DLT. The new DLT reflects the storage of data objects in the storage node 130 of the SN DLT update module 410.

In step 1060, the SN DLT update module 410 notifies the DLT master system 140 that the update process is complete. The update process can include storing the new DLT in the SN DLT 430.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method for assigning storage responsibility in a distributed data storage system, the method comprising:
   receiving notice of a triggering event indicating a change in storage capacity or a performance capability of at least one storage node of a set of storage nodes in the distributed data storage system;
   identifying an updated set of storage nodes in the distributed data storage system following the triggering event;
   determining a plurality of responsibility levels for the distributed data storage system, the plurality of responsibility levels including at least a primary responsibility level, a secondary responsibility level, and a tertiary responsibility level;
   calculating, for each storage node in the updated set of storage nodes, a number of tokens to be allocated to the storage node for each of the plurality of responsibility levels;
   comparing, for each storage node in the updated set of storage nodes, the calculated number of tokens for each of the plurality of responsibility levels to an existing number of tokens assigned to each of the plurality of responsibility levels;
   responsive to identifying a difference between the calculated number of tokens and the existing number of tokens assigned to a storage node for one of the secondary responsibility level or the tertiary responsibility level, modifying a master data location table that causes the updated set of storage nodes to reallocate tokens according to the calculated number of tokens for the one of the secondary responsibility level or the tertiary responsibility level while maintaining the existing number of tokens assigned to other responsibility levels of the plurality of responsibility levels for each storage node in the updated set of storage nodes;
   sending the modified master data location table to each of the plurality of storage nodes in the updated set of storage nodes; and
   receiving notice from each of the plurality of storage nodes in the updated set of storage nodes that tokens have been transferred among the updated set of storage nodes, according to the modified master data location table, responsive to the triggering event.

2. The method of claim 1 wherein the master data location table comprises a plurality of entries, each entry comprising a responsibility level and at least one storage node assigned to the responsibility level for one of the calculated number of tokens.

3. The method of claim 1 wherein the triggering event comprises at least one storage node becoming unavailable.

4. The method of claim 1 wherein the triggering event comprises at least one additional storage node becoming available in the updated set of storage nodes.

5. The method of claim 1 wherein the triggering event comprises a weight of one or more storage nodes in the updated set of storage nodes changing, the weight of the one or more storage nodes specifying a performance capability of the one or more storage nodes relative to a performance capability of the updated set of storage nodes.

6. The method of claim 1 wherein the number of tokens has a 1:1 mapping with a number of partitions included in the updated set of storage nodes.

7. The method of claim 1 wherein sending the modified master data location table causes the updated set of storage nodes to maintain a desired distribution across responsibility levels.

8. A system for assigning storage responsibility in a distributed data storage system comprising a processor, a memory, and executable instructions stored in the memory that when executed by the processor cause the system to perform operations comprising:
   receive notice of a triggering event indicating a change in storage capacity or a performance capability of at least one storage node of a set of storage nodes in the distributed data storage system;
   responsive to receiving the notice, identify an updated set of storage nodes;
   determine a plurality of responsibility levels for the distributed storage system, the plurality of responsibility levels including at least a primary responsibility level, a secondary responsibility level, and a tertiary responsibility level;
   for each storage node in the updated set of storage nodes, calculate a number of tokens to be allocated to the storage node for each of the plurality of responsibility levels;
   for each storage node in the updated set of storage nodes, compare the calculated number of tokens for each of the plurality of responsibility levels to an existing number of tokens assigned to each of the plurality of responsibility levels;
   responsive to identifying a difference between the calculated number of tokens and the existing number of tokens assigned to a storage node for one of the secondary responsibility level or the tertiary responsibility level, create an adjusted master data location table that causes the updated set of storage nodes to reallocate tokens according to the calculated number of tokens for the one of the secondary responsibility level or the tertiary responsibility level while maintaining the existing number of tokens assigned to other responsibility levels of the plurality of responsibility levels for each storage node in the updated set of storage nodes;

send the adjusted master data location table to each of the plurality of storage nodes in the updated set of storage nodes; and receive notice from each of the plurality of storage nodes in the updated set of storage nodes that tokens have been transferred as directed by the adjusted master data location table.

9. The system of claim 8 wherein the master data location table comprises a plurality of entries, each entry comprising a responsibility level and at least one storage node assigned to that responsibility level for one of the calculated number of tokens.

10. The system of claim 8 wherein the triggering event comprises at least one storage node becoming unavailable.

11. The system of claim 8 wherein the triggering event comprises at least one additional storage node becoming available in the updated set of storage nodes.

12. The system of claim 8 wherein the triggering event comprises a weight of one or more storage nodes changing.

13. A non-transitory storage medium having executable instructions encoded thereon, which, when executed by at least one processor of a machine, cause the machine to perform operations comprising:

receive notice of a triggering event indicating a change in storage capacity or a performance capability of at least one storage node of a set of storage nodes in a distributed data storage system;

responsive to receiving the notice, identify an updated set of storage nodes;

for each storage node in the updated set of storage nodes, calculate a number of tokens to be assigned to the storage node for each of a plurality of responsibility levels, the plurality of responsibility comprising a primary responsibility level, a secondary responsibility level, and a tertiary responsibility level;

for each storage node in the updated set of storage nodes, compare the calculated number of tokens for each of the plurality of responsibility levels to an existing number of tokens assigned to each of the plurality of responsibility levels;

responsive to identifying a difference between the calculated number of tokens and the existing number of tokens assigned to a storage node for the secondary responsibility level, create an adjusted master data location table that causes the updated set of storage nodes to reallocate tokens according to the calculated number of tokens for the secondary responsibility level for at least one storage node in the updated set of storage nodes while maintaining the existing number of tokens assigned to the primary and tertiary responsibility levels for each storage node in the updated set of storage nodes;

send the adjusted master data location table to each of the plurality of storage nodes in the updated set of storage nodes; and receive notice from each of the plurality of storage nodes in the updated set of storage nodes that tokens have been transferred as directed by the adjusted master data location table.

14. The non-transitory storage medium of claim 13 wherein the adjusted master data location table comprises a plurality of entries, each entry comprising a responsibility level and at least one storage node assigned to that responsibility level for one of the calculated number of tokens.

15. The non-transitory storage medium of claim 13, wherein the triggering event comprises at least one storage node becoming unavailable.

16. The non-transitory storage medium of claim 13, wherein the triggering event comprises at least one additional storage node becoming available in the updated set of storage nodes.

* * * * *